United States Patent [19]
Bock et al.

[11] 3,708,664
[45] Jan. 2, 1973

[54] DIAGNOSTIC X-RAY SYSTEM

[75] Inventors: John W. Bock; Orrin G. Feiertag; Raymond J. Sullivan, all of Milwaukee, Wis.

[73] Assignee: General Electric Company

[22] Filed: Nov. 12, 1970

[21] Appl. No.: 88,891

[52] U.S. Cl. ................. 250/61.5, 250/57, 250/91, 250/105
[51] Int. Cl. ............................................. G01n 23/00
[58] Field of Search ....... 250/53, 57, 58, 61, 61.5, 91, 250/92, 105

[56] References Cited

UNITED STATES PATENTS 2,491,224   12/1949   Stava ................................. 250/61.5

FOREIGN PATENTS OR APPLICATIONS

1,360,575   3/1964   France ............................. 250/61.5

Primary Examiner—William F. Lindquist
Attorney—Arthur V. Puccini, Frank L. Neuhauser, Oscar B. Waddell, Joseph B. Forman and Jon Carl Gealow

[57] ABSTRACT

A tilting diagnostic x-ray table is provided with a longitudinally extending beam at its rear. A tube carriage is movable lengthwise of the beam. A column extending upwardly from the tube carriage supports a horizontal tube arm for bidirectional translation laterally of the x-ray table top. At the end of the arm, which is over the table, there is an x-ray tube which is on a rotational axis that extends longitudinally of the table. Means are provided for laterally angulating the x-ray tube on its longitudinal axis synchronously with translational movements of the tube arm so that the central beam from the x-ray tube is always pointed essentially at the center of the x-ray image sensing device which is under the table top. Means are also provided for angulating the tube longitudinally as the tube carriage is shifted on the beam in conjunction with tomography.

12 Claims, 14 Drawing Figures

PATENTED JAN 2 1973

INVENTORS
JOHN W. BOCK
RAYMOND J. SULLIVAN
ORRIN G. FEIERTAG
BY
ATTORNEYS

INVENTORS
JOHN W. BOCK
RAYMOND J. SULLIVAN
ORRIN G. FEIERTAG

By

ATTORNEYS

INVENTORS
JOHN W. BOCK
RAYMOND J. SULLIVAN
ORRIN G. FEIERTAG

ATTORNEYS

DIAGNOSTIC X-RAY SYSTEM

BACKGROUND OF THE INVENTION

The most common type of x-ray examination involves having the patient lying on the table top. The x-ray tube is over the patient. X-rays penetrate the patient and the table top and the intervening part of the patient's anatomy is recorded on a film or visualized with an image intensifier either or both of which may be inside the table body under the top. In such case all layers of the patient's body are superimposed at the plane of the imaging device.

Sometimes the organ of primary interest has other organs above or below it so that it is difficult to distinguish tissue of one organ from that of another on the imaging device. In such situations, it is sometimes advantageous to take an angular view of the organ of interest on a more direct line from the x-ray tube to the imaging device so as to avoid anatomical parts which may otherwise intervene. For this reason, conventional x-ray tables were adapted for angulating the tube longitudinally of the table top and certain standard x-ray technics were founded on the ability to angulate the tube longitudinally. Standard charts specified a longitudinal tube angle and the position of the patient for supposedly obtaining the most direct view of the organ in question. Frequently, however, when the radiograph was viewed it was evident that optimum tube angulation and patient position were not realized in which case the patient was often returned to the x-ray table to have the procedure repeated using a different tube angle or patient position. This is inconvenient for the radiologist and the patient and subjects the patient undesirably to multiple radiation exposures.

In some x-ray systems in which the x-ray tube support is mounted independently of the table it has been possible to angulate the x-ray tube laterally of the table top. With these systems the radiologist had to exercise judgment as to whether the x-ray beam penetrated the patient at a proper angle and he had no way of knowing whether the image was centralized on the imaging device. Sometimes part of the picture was cut off because the central x-ray beam was not anywhere near the center of the film and the margins of the field were often cut off by interfering mechanism in the table. This happened even though the procedures were carried out at a lateral tube angulation that had been selected from a standard technic chart. This meant that the patient had to be returned to the x-ray table for taking one or more additional views in many instances in which case the diagnosis would be delayed because it could not be determined whether or not the film was satisfactory until it had been developed.

Many x-ray tables are not equipped to angulate the x-ray tube either laterally or longitudinally of the table top. The only way to view an organ from an angular aspect with this type of table is to rotate the patient until any intervening organ is hopefully cleared. This can be checked by taking radiographs and repeatedly returning the patient to the x-ray examination table until the desired view is obtained or, if the table has an image intensifier and monitor, the correctness of the view may be determined from the intensifier and the patient may be rotated until the desired view is obtained. This procedure has a number of disadvantages among which are that an attendant must exert considerable effort to position the patient, the patient has a tendency to roll back to an equilibrium position of improper orientation, the patient may experience discomfort and some organs may shift in the body when the patient is rolled so that further interference is created. Moreover, having an attendant present to manipulate the patient defeats the primary purpose of rer. )tely operated x-ray tables which is to minimize the cumulative x-ray dosage of technicians and radiologist as well as patients.

For the comfort and convenience of the patient and the radiologist, it is desirable to be able to perform a variety of x-ray examination technics with a single x-ray table or diagnostic system. Apparatus has been provided heretofore for performing some of the above mentioned technics on specialized tables. Some tables were more versatile than others but generally those which permitted performing one set of technics did so at the expense of foregoing other technics or procedures. This meant that the patient had to be transferred from one diagnostic system or table to another for a complete examination.

SUMMARY OF THE INVENTION

A general object of the present invention is to provide a diagnostic x-ray system in which the patient may be completely examined in accordance with most if not all of the accepted and commonly used diagnostic technics.

Another object of this invention is to provide apparatus which allows predetermining whether a proposed angular view of the patient's anatomy will result in an image that yields maximum diagnostic information contemporaneously with having the patient on the x-ray table for the first time. With respect to taking lateral angular views of the patient, this object is realized by supporting the x-ray tube over the table in such manner that it can be translated laterally while it is synchronously angulated in which case the central x-ray beam is always pointed substantially toward the center of the imaging device.

Another object of this invention is to provide a single diagnostic x-ray system for various x-ray procedures such as tomography, spot filming, lateral and longitudinal angular viewing, fluoroscopy with image intensification and direct recording of the image on the radiographic film. A corollary of this object is to provide apparatus which permits locating the patient in a variety of positions with respect to the x-ray source and the imaging devices so that images of almost any aspect can be recorded on film or directly visualized.

A further object is to provide a diagnostic system which permits conducting tomography or making body section views of various planes in the body, with controlled amounts of image magnification or, alternatively, maintaining uniform magnification as between planes or sections taken at various levels in the body.

The new diagnostic system is characterized by a tilting x-ray table which can be angulated from a horizontal position to either vertical position. The table has an x-ray transparent top which may be selectively elevated with respect to the table body and to the image sensing device. A patient on the table top may thus be positioned at a selected distance from the x-ray source which is over the table. This distance governs image magnification which is thereby placed under control of the operator during direct radiography and during tomography. The x-ray image may be previewed with an image intensifier which is inside the table body under the table top and which is coupled with a TV camera to a viewing monitor. The image may be recorded permanently by advancing a film cassette between the table top and the image intensifier.

Mounted at the rear of the x-ray table and supported on the body for tilting with it is a longitudinally extending beam. There is a tube support carriage which is adapted to be translated along the beam by a motor driven mechanism. A vertical column extends upwardly from the tube carriage and supports a laterally extending tube arm for translating over and laterally of the table top. An x-ray tube casing is mounted in a yoke at the end of the tube arm and is positionable over the lateral dimension of the table top. The tube arm is advanced and retracted laterally by means of a motor driven mechanism. Means are provided to automatically angulate the x-ray tube in proportion to the amount of travel of the tube arm. The tube angulates laterally in a direction opposite of that in which the arm is moved. This keeps the x-ray beam properly located on the imaging device inside of the table body.

There is also a tomographic mechanism support carriage mounted for translation on the longitudinal beam. A tomographic link is pivotally mounted on this tomographic carriage. The tomographic pivot carriage and the tube carriage can be aligned and locked together for scanning the x-ray tube longitudinally of the table. In the tomographic mode, the tomographic pivot carriage is locked to the table body and the tube carriage is free to translate on the beam for the purpose of swinging the tomographic arm so that the x-ray tube and the image recording device move in opposite directions.

How the above mentioned objects and other more specific objects are achieved in the new integrated diagnostic x-ray system will appear from time to time throughout the course of the ensuing description of the invention taken in conjunction with the drawings.

DESCRIPTION OF A PREFERRED EMBODIMENT

Figure 1:
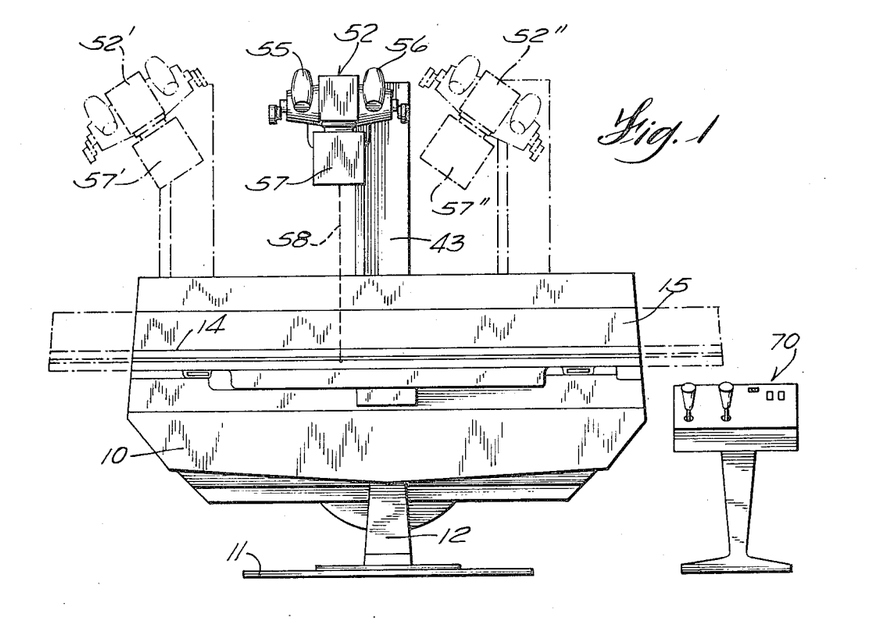
FIG. 1 is a front elevation view of an x-ray table which incorporates the invention.
Figure 2:
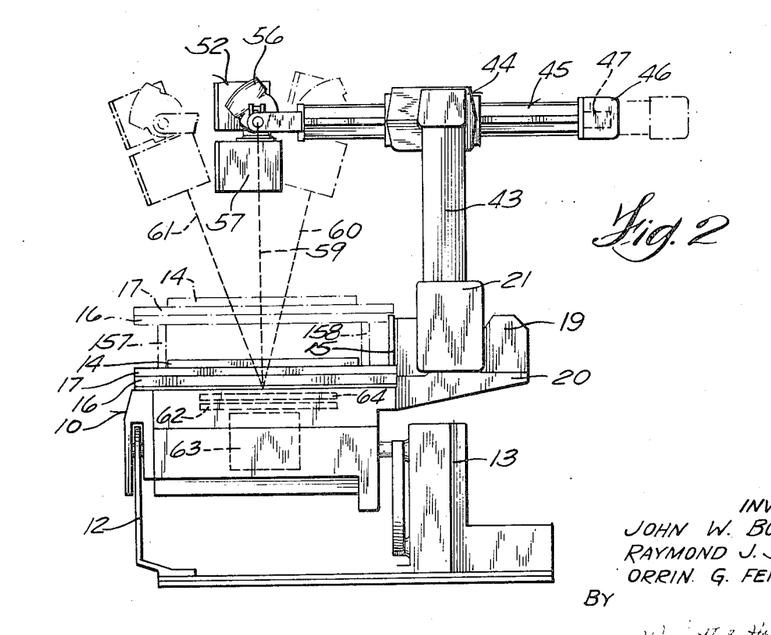
FIG. 2 is an elevation view of the x-ray table in FIG. 1 taken from the right side thereof.

In FIG. 1 the x-ray table body is generally designated by the reference numeral 10. The body is supported on a base 11 which has a front leg 12 and a rear tilting and translating supporting mechanism 13 as can be seen in FIG. 2. The mechanism for tilting the table body from horizontal to either vertical position while at the same time translating it on its pivot so that the body will not strike the floor during tilting is not shown in detail nor will it be described because it is conventional.

Table body 10 supports an x-ray transparent patient supporting table top 14 as indicated in FIGS. 1 and 2. The top is preferably curved in transverse cross section. The table top 14 is adapted for being shifted in either lateral direction which would be to the right and left as viewed in FIG. 2. The top supporting base 17 is movable longitudinally and when it moves it carries table top 14 with it. Note that the table top has an integral vertical backboard 15 which serves to protect the patient against involvement with the mechanism at the rear of the table top supporting base 17 when it is being shifted longitudinally, or when the patient is merely reposed on the table top. As can be seen in FIG. 2, the supporting base 17 is supported on a base 16 which is adapted to rise vertically and carry base 17 and top 14 with it.

Extending rearwardly from the table body 10 and adapted to tilt with the body are some support brackets 20. These brackets support a beam assembly which is generally designated by the reference numeral 21 and extends longitudinally and substantially coextensively with the table body. The beam 21 is similar to a box girder as can be seen where it is shown in cross section in FIG. 3. In the latter figure one may also see that the beam is provided with side rails 22 and 23 and a top rail 24. An x-ray tube support carriage 25 is mounted for moving longitudinally of the rails on the beam. The inside of the tube support carriage 25 has several pairs of rollers such as 26, 27 and 28, 29 and 30, 31 which cooperate with respective rails 22, 23 and 24 and support the tube carriage 25 for longitudinal movement on the beam in a manner that is evident from inspection of FIG. 3. A motor 19 for shifting tube carriage 25 longitudinally of beam 21 and the table body is also mounted on one of the brackets 20 as can be seen in FIG. 2.

Figure 3:
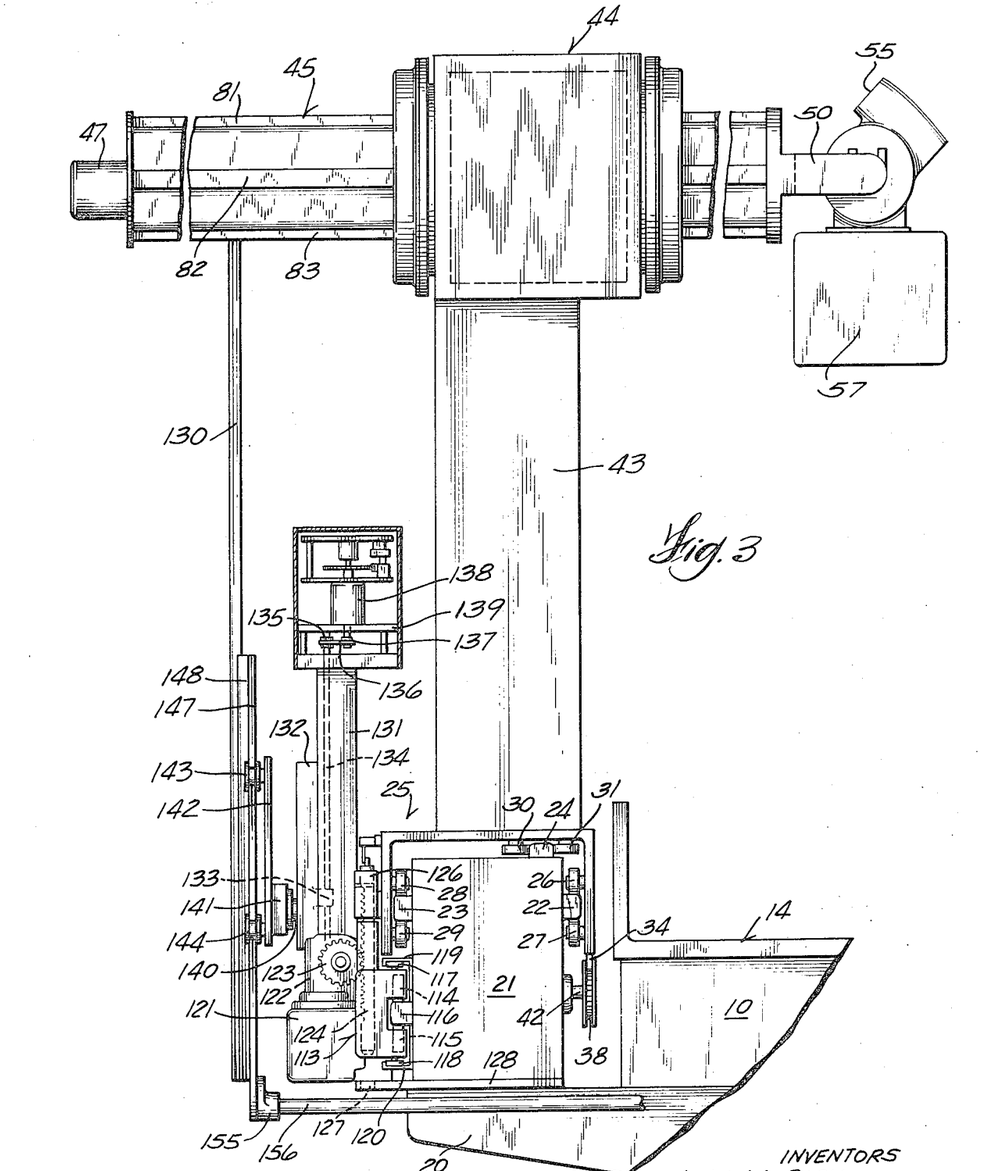
FIG. 3 is an elevation view of certain parts of the table including the x-ray tube arm, the support column therefore, the beam on which it translates, the tomographic carriage and its associated mechanism together with a fragment of the x-ray table body and top.
Figure 9:
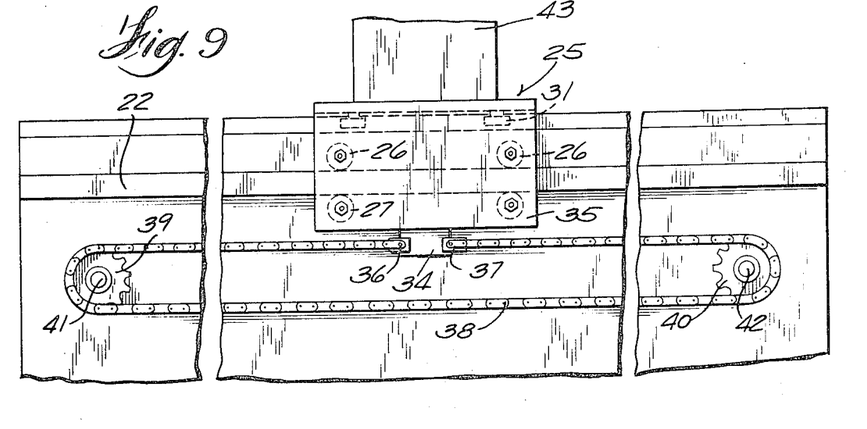
FIG. 9 is a view taken from the front side of the beam which is behind the table, with parts removed, to show the x-ray tube carriage together with the elements for translating it on the longitudinal beam.

As can be seen in FIGS. 3 and 9, a bar 34 extends downwardly from the front vertically dependent portion 35 of tube carriage 25. Bar 34 has the opposite ends 36 and 37 of a chain 38 attached to it. The chain is a closed loop and runs on sprockets 39 and 40 which are respectively on an idler shaft 41 and a power driven shaft 42 which extends from the motor drive 19 seen in FIG. 2 supported on bracket 20. It should be evident that when sprocket 40 is driven, chain 38 will translate and shift tube carriage 25 longitudinally to either the right or left depending on the direction of rotation of the sprocket 40.

FIGS. 1, 2, 3 and 9 show a vertically extending column 43 supported on and attached to tube carriage 25. Column 43 thus translates in either direction longitudinally of the x-ray table on tube carriage 25 as commanded. On top of column 43 there is a bearing housing 44 whose contents will be described in detail subsequently. For present purposes it is sufficient to observe that an x-ray tube support arm 45 is adapted for executing bidirectional translational movement through bearing housing 44 in a direction which is lateral to the x-ray table top. At the rear end of the tube arm 45 as seen in FIG. 2 there is a housing 46 containing a motor 47 which is adapted for advancing and retracting tube arm 45 laterally of the table top 14. The details of the tube arm drive will be discussed later.

Figure 6:
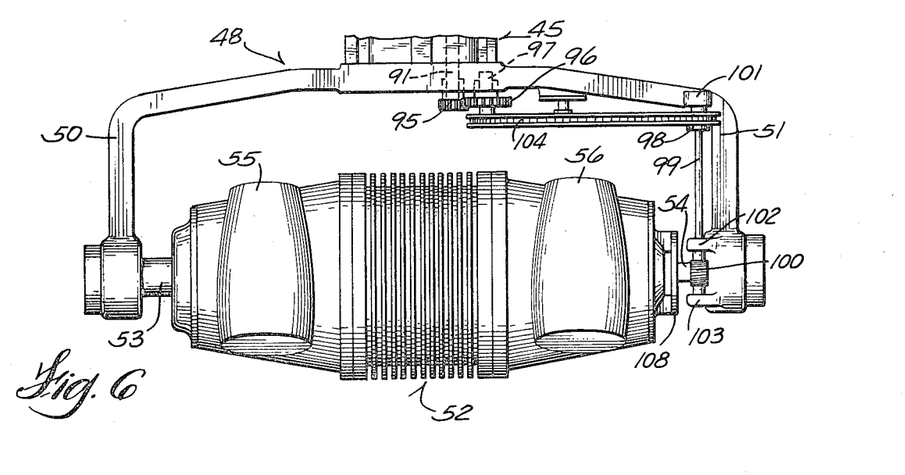
FIG. 6 is a top view of the x-ray tube casing, its supporting yoke, and lateral angulating mechanism.
Figure 7:
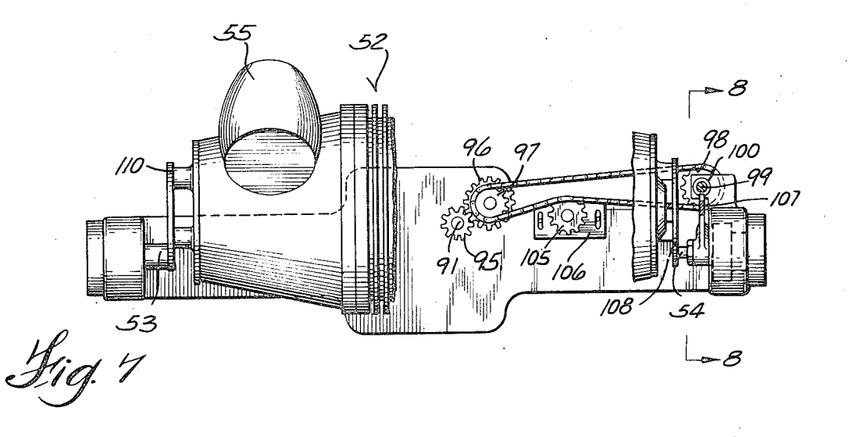
FIG. 7 is a front view of the tube casing shown in the preceding figure with parts broken away to expose certain parts of the lateral angulating mechanism.

The front end of tube arm 45 supports a yoke 48, see FIGS. 2, 6 and 7, which has a base and arms 50 and 51 spaced apart for embracing an x-ray tube casing 52 between them. The x-ray tube casing is supported on trunnion shafts 53 and 54 which are journaled in the arms 50 and 51 respectively of the yoke. Thus, the x-ray tube casing may be angulated laterally of the table top on the longitudinally directed axes of the trunnion shafts, 53 and 54. The focal spot of the x-ray tube, not shown, within casing 52 is at the point of intersection of the aligned longitudinally directed trunnion axes 53 and 54 and the laterally directed axis of tube arm 45. Thus, it will be evident that if the tube arm 45 is rotated axially to angulate the tube casing longitudinally or if the tube casing 52 is angulated laterally, the focal spot of the x-ray tube will remain at a constant elevation at all times. The x-ray tube casing 52 has sockets 55 and 56 for receiving the terminals of electric cables which are not shown. The x-ray tube casing is equipped with a basically conventional collimator 57 as shown only in FIGS. 1 and 2. The central x-ray emanating from the focal spot of the concealed x-ray tube is suggested by the dashed line 58 in FIG. 1 and by the dashed lines 59, 60 and 61 in FIG. 2 where the x-ray tube casing and collimator are shown in solid lines when they are centered over the table and in phantom lines where they are angulated laterally.

In FIG. 2 tube arm 45 is depicted in a position where the x-ray tube casing 52 and the focal spot of the x-ray tube are laterally centrally located over both the table top and the imaging devices within the table body 10. One imaging device may be a film cassette as shown by the dashed line rectangle 62 and another may be an image intensifier 63. A motor driven mask or shutter mechanism 64 is also interposed. The central ray 59 from the x-ray tube is vertical when casing 52 and collimator 57 are in their solid line positions as indicated in FIG. 2. When tube arm 45 is advanced to the left, however, as viewed in FIG. 2, in accordance with the invention, the tube casing 52 automatically assumes the adjacent broken line positions and the tube casing and collimator 57 angulate laterally as indicated. The central beam 61 from the angulated tube casing is then at an angle with respect to vertical. Similarly, when tube arm 45 is retracted to the right in FIG. 2, tube casing 52 and collimator 57 automatically angulate laterally in the opposite direction and the central beam, indicated by the dashed line 60, is at an angle with respect to vertical.

As can be seen in FIG. 2, regardless of the amount of lateral angulation of tube casing 52 the central rays 60 and 61 are directed toward a common point of intersection in the film plane 62.

The x-ray image intensifier 63 is of a type which is now commonly used for converting an x-ray image to an optical image. The optical image may be viewed with a television camera, not shown, which is located inside of the table body so that an enlarged optical image can be displayed on a remote monitor, not shown.

The film cassette 62 is merely symbolized by broken lines in FIG. 2. The cassette is normally held in a tray, not shown, mounted on a spot film carriage which has also been omitted from this figure. The film carriage may be conventional in the respect that it is adapted to support a cassette which may be projected into the path of the x-ray beam for the purpose of making a permanent recording of the x-ray image when something of interest is visualized by the radiologist on the TV monitor which displays the optical image from the image intensifier 63. Supported above the plane of the film carriage are the blades of shutter 64 which are symbolized by broken lines. The mechanism for supporting and operating the shutter is not shown. In the actual apparatus, the shutter may be driven remotely to define the size of the image which is projected on the film cassette 62.

The new x-ray table is also adapted to conduct body-section radiography or tomography as is suggested in FIG. 1. To initiate the tomographic technic, the x-ray tube carriage 25 and its vertical column 43 are initially positioned at one end of the table with the x-ray tube casing 52 angulated longitudinally toward the film cassette 62 which is inside the table body. The tomographic system, which will be described later, is then activated and the tube carriage and column 43 are translated toward the other end of the table while the film cassette 62 within the table moves in the longitudinally opposite direction. The x-ray tube casing and the film cassette carriage are connected with a tomographic link, which will be described, so that the cassette and tube casing move in opposite directions. During tomography, the central x-ray always passes through the pivot axis of the tomographic link so that planes in the body at the level of the pivot remain in focus and planes above and below the pivot axis undergo relative motion and are blurred out on the film.

All functions of the apparatus may be controlled from a remote control console which is symbolized in FIG. 1 and marked with the reference numeral 70. By manipulating levers and selecting the proper push buttons on the console, the examining radiologist can condition the apparatus for conducting various examination technics such as tomography, flouroscopy, longitudinal and lateral scanning, and the taking of views from an angular aspect. Raising the table top, shifting it and tilting the whole table from horizontal to vertical can also be controlled from the console. Suitable limit switches, interlocks and safety devices, not shown, are provided to prevent conflicting commands and to indicate the state or position of the apparatus components at the control console 70.

The mechanism for angulating the x-ray tube casing 52 laterally of the table top while the x-ray tube arm 45 is being simultaneously advanced or retracted over the table top 14 will now be described in reference to FIGS. 2, 3, 4, 5 and 6. In FIG. 3 one may see that the tube arm 45 is adapted to reciprocate biaxially through bearing housing 45 which is fastened to and longitudinally displaced from vertical column 43. It will appear that tube arm 45 is also adapted to rotate about its longitudinal axis in the housing 44 under certain circumstances.

Figure 4:
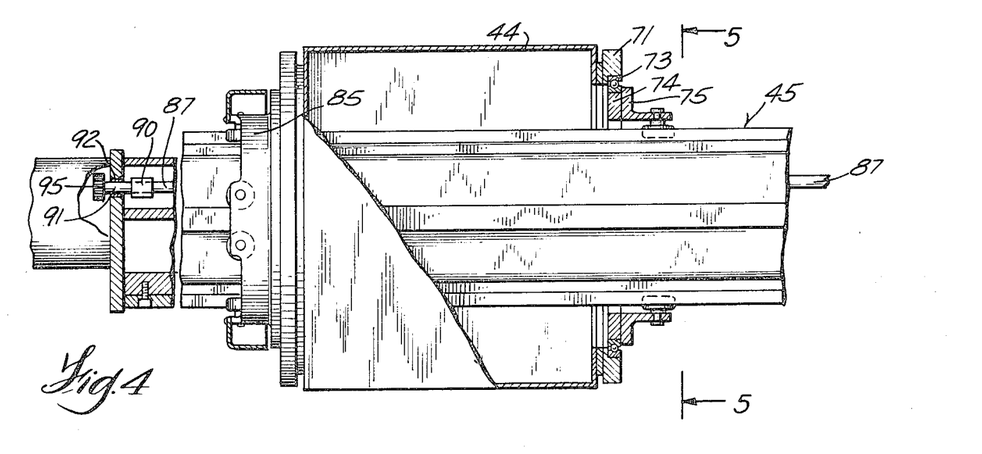
FIG. 4 is a side view with parts broken away, of the tube arm and its supporting column.
Figure 5:
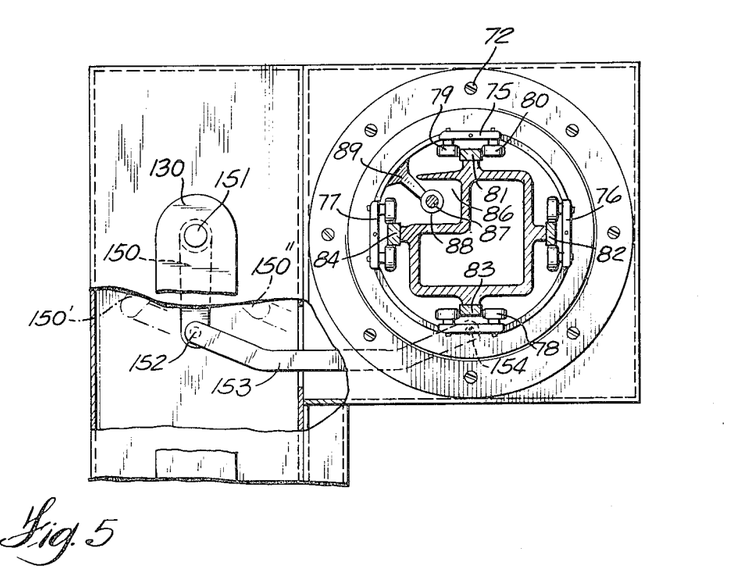
FIG. 5 is a partial sectional view taken on the line 5—5 in FIG. 4.

The bearing structure for tube arm 45 may be seen most clearly in FIGS. 4 and 5. FIG. 4 shows the cross section of a stationary bearing mounting ring 71 which is fastened to housing 45 by any suitable means, such as screws 72 in FIG. 5. Recessed in ring 71 is a large ball bearing 73 which encircles tube arm 45. The inner race of the ball bearing fits tightly on a ring 74 which has four roller brackets 75, 76, 77 and 78 as can be seen in FIG. 5. Each roller bracket has a pair of rollers such as typified by 79 and 80 which rotate on studs which are fixed in the roller brackets. The pairs of rollers 79 and 80 are spaced apart so as to engage a track 81 between their peripheral surfaces. There are four similar tracks 81, 82, 83 and 84 spaced in quadrature around tube arm 45. These tracks are substantially coextensive with the length of the tube arm. It should be evident then that the tube arm 45 is adapted to slide axially of itself and laterally of the x-ray table top by reason of the cooperation between the various pairs 79, 80 of rollers and the tracks 81 – 84. It should also be evident that the tube arm 45 may rotate about its axis by reason of its being mounted in ring bearing 73. Since the rear bearing structure which has just been described is similar to the front bearing structure 85, the latter will not be described in detail.

FIG. 5 shows a cross section of tube arm 45. This arm is preferably extruded with a hollow interior and a longitudinal channel 86 substantially coextensive with its length. Extending lengthwise of channel 86 is a lead screw 87 which appears in cross section in FIG. 5. The lead screw is encircled by an internally threaded nut 88 which is fixed in an arm 89. The arm 89 is fastened to the ring 74 which supports the various roller brackets 75 – 78. As can be seen in FIG. 4, at the front end of the tube arm, lead screw 87 terminates in a coupling 90 which connects with a stub shaft 91. The shaft 91 is journaled in a bearing 92 which is supported in the base 49 of tube yoke 48. The tube yoke base 49 is secured on the end of tube arm 45 with four cap screws. At the rear end of the tube arm there is a motor 47, see FIGS. 2 and 3, which has its frame fastened to the tube arm 45 and the output shaft of its speed reducer directly connected to lead screw 87.

Motor 47 is reversible. When it turns lead screw 87 in one direction, the lead screw advances in nut 88 which is stationary although the nut can orbit with the whole ring bearing structure. The interaction between the lead screw and the stationary nut 88 moves the tube arm 45 axially. If the motor is reversed, the lead screw 87 turns oppositely and moves the tube arm 45 in an opposite axial direction.

As stated, arm driving motor 47 is mounted on the bilaterally movable tube arm 45. The lead screw 87 is journaled at opposite ends of the tube arm 45. The nut 88 is on an arm 89 which is effectively fastened to the inner race of the large arm-encircling ball bearing 73. Thus, when a torsional force is applied to tube arm 45, the roller brackets 75 - 78 and the stationary lead screw nut 88 will revolve together since they are both effectively fastened to the inner race of the large arm-encircling ball bearing 73. This construction enables rotating the tube arm 45 while still retaining the ability to shift the tube arm bilaterally of the x-ray table.

The manner in which the x-ray tube casing 52 is angulated laterally of the table top simultaneously and automatically with lateral advancement and retraction of the tube arm 45 will now be described. Referring to FIG. 2, it will be seen that the central x-ray beam 59 is always directed toward the center of the image devices within the table regardless of the amount of tube casing 52 angulation or the coordinate amount of the tube arm advancement or retraction. Thus, tube and collimator angulation is maintained substantially proportional to the amount of tube arm movement. In practice, the radiologist may examine the organ of interest by initially having the x-ray tube positioned centrally of the x-ray table as indicated by the solid line position of the tube casing in FIG. 2. The organ would be visualized on the TV monitor, not shown, which displays the image produced in image intensifier 63 within x-ray table 10. If the radiologist decides that he can obtain a better view of the organ from an angular aspect, he would press a push button in the control console 70 to operate lead screw motor 47 which would advance or retract tube arm 45 as desired and simultaneously angulate the case 52 proportionally. Of course, no thought need be given by the radiologist to angulation of the tube casing because this is taken care of automatically. After shifting the tube arm 45 laterally, the radiologist might again energize the x-ray source and view the image on the monitor to see if he is obtaining the optimum view of the organ of interest. A view satisfactory for permanent recording is usually determined after one or two inspections on the monitor at which time the permanent radiograph may be made using the film cassette. This is highly advantageous over the prior art since the correctness of the angle can now be determined before the radiograph is developed. Moreover, the patient need not be rotated so the disadvantages mentioned in the early part of this description are obviated.

As explained earlier, the tube arm 45 is advanced and retracted laterally by motor powered rotation of lead screw 87. In FIGS. 4 and 7 one may see that lead screw 87 terminates in a stub shaft 91 which is journaled in the base 49 of the tube casing support yoke 48. At the end of lead screw shaft extension 91 there is a pinion 95 which is meshed with a gear 96. The gear 96 is fixed on a shaft 97 which is journaled in the base 49 of the tube yoke 48. On the same shaft with gear 96 is a sprocket 97. Displaced in the longitudinal direction of the table from sprocket 97 is another sprocket 98 which is carried on a shaft 99. This shaft has a worm 100 near one of its ends. Shaft 99 is journaled at 101, 102 and 103. The sprocket 98 on shaft 99 is coupled to the driving sprocket 97 by means of a closed loop chain 104. An idler sprocket 105 which is rotatably mounted on a slidably adjustable plate 106 is used for establishing proper chain tension.

Figure 8:
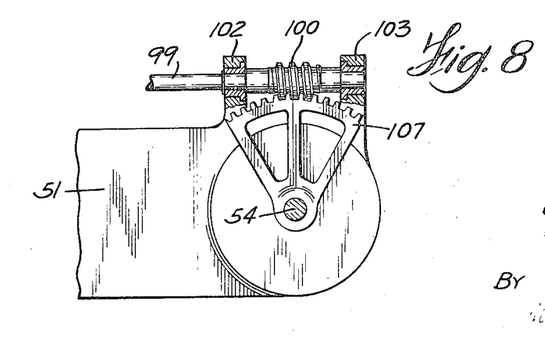
FIG. 8 is a fragmentary view of another part of the x-ray tube lateral angulating mechanism.

As can be seen in FIG. 8, worm 100 is meshed with a tooth wheel sector 107. The sector 107 is on a shaft 54 which is journaled at one end in the arm 51 of the tube supporting yoke 48 and has its other end engaged with a plate 108 that is fastened to the tube casing 52. The longitudinally directed axis of shaft 54 is thus the axis about which tube casing 52 is adapted to angulate laterally of the x-ray table. This axis, if projected across the tube casing, will pass through the focal spot within the x-ray tube in the casing. This focal spot is also a point of common intersection with the axis of the x-ray tube arm 45. At the left end of FIG. 7, one may see that there is another plate 110 from which extends a shaft 53 which is journaled in the end of the left arm 50 of the tube support yoke 48. The axis of shaft 53 is, of course, coincident with the x-ray tube focal spot as is the axis of shaft 54 at the right side of tube casing in FIG. 8.

When the tube arm lead screw 87 turns, worm 100 turns and drives sector 107 rotationally. The tube casing then angulates about the axis of shaft 54 on which sector 107 is fastened and also about the coincident axis of shaft 53 at the other end of the tube casing. Turning of the lead screw 87 thus advances or retracts the tube arm 45 while simultaneously and proportionately angulating the tube casing 52 in an angular direction from center which is opposite from the direction of tube arm movement.

As stated earlier, the diagnostic system is also adapted for scanning the x-ray tube casing 52 longitudinally of the table without angulating the tube casing longitudinally. The apparatus is also adapted for conducting tomography at which time the x-ray tube casing is translated longitudinally of the table and simultaneously angulated longitudinally.

Figure 10:
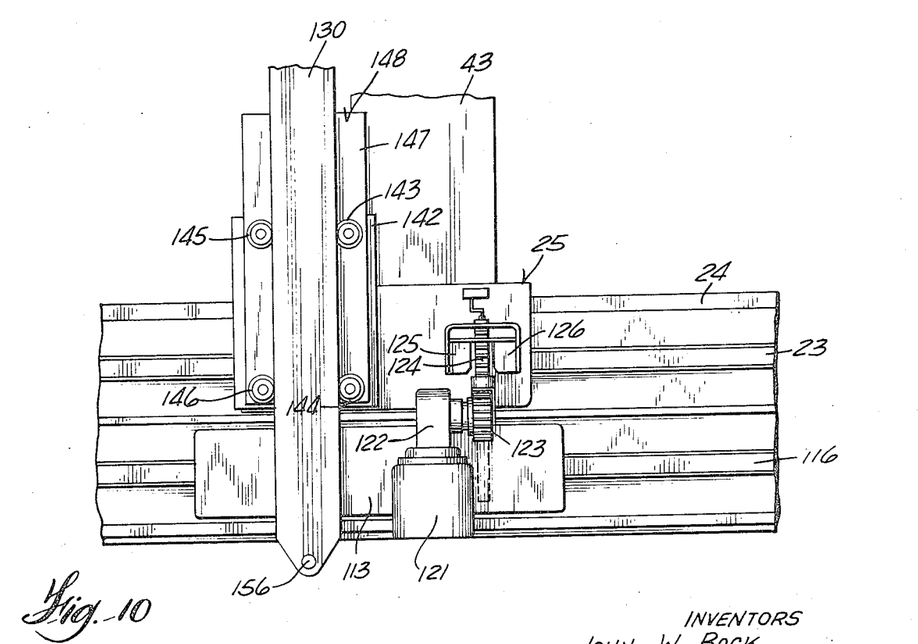
FIG. 10 is a fragmentary view taken from the back of the x-ray table to show the relationship of the tube carriage and the tomographic carriage with respect to the beam and the tomographic drive mechanism.

The components involved in longitudinal scanning and in tomography will now be described. FIG. 3 shows how tube carriage 25 is adapted to translate longitudinally of the table on beam 21. As explained earlier, tube carriage 25 may be translated longitudinally under the influence of a chain 38 which is driven by sprocket 40 as can be seen in FIG. 10. The motor for driving sprocket 40 is not shown but in FIG. 3 it is evident that driving shaft 42 for the sprocket 40 extends out of the motor drive 19 seen in FIG. 2. Shaft 42 is motor driven at the command of the operator at control console 70. Usually during scanning, the x-ray tube will not be angulated and the central x-ray 58 will be directed vertically toward the x-ray table top as indicated in FIG. 1. FIGS. 3 and 10 show that there is a second carriage 113 adapted to run on the backside of longitudinally extending beam 21. The second carriage is for tomography. Carriage 113 has upper and lower sets of rollers 114 and 115 which are on horizontal rotational axes so they may roll on a stationary rail 116 which extends in a longitudinal direction over part of the length of beam 21. There are also a pair of upper and lower U-shaped tracks 119 and 120 which are engaged on their insides by rollers 117 and 118, respectively, that have their axes of rotation vertically oriented.

The tube carriage 25 is interlocked with tomographic carriage 113 during longitudinal scanning. During tomography, the tube carriage 25 moves longitudinally but the tomographic carriage 113 is disengaged from the tube carriage and clamped to the beam 21 so as to hold the tomographic carriage 113 stationary.

The means for alternatively interlocking the carriages 25 and 113 or clamping the tomographic carriage so that the tube carriage can translate independently are depicted in FIGS. 3 and 10. A motor 121 is mounted on the tomographic carriage 113. The motor has a speed reducer 122 whose output shaft carries a pinion 123. The pinion 123 is engageable with the teeth of a gear rack locking pin 124. The gear rack pin 124 is slidably supported on the tomographic carriage 113 so that when pinion 123 turns in one direction it will drive pin 124 upwardly and when it turns in an opposite direction it will drive pin 124 downwardly. In FIG. 10 it is evident that when pin 124 is driven upwardly it is admitted between a pair of stop blocks 125 and 126 which are fastened to tube carriage 25. This results in interlocking tube carriage 25 and tomographic carriage 113. On the other hand, during tomography it is necessary to hold the tomographic carriage 113 in a fixed position and to let the tube carriage 25 translate under the influence of power. Thus, during tomography, rack pin 124 is driven downwardly at a time when the x-ray tube support is located essentially centrally with the table. Such downward driving of the rack pin 124 causes its lower end to register in a stop hole 127 which is in the base plate 128 underneath beam 21. This anchors the tomographic carriage 113 to beam 21.

Figure 11:
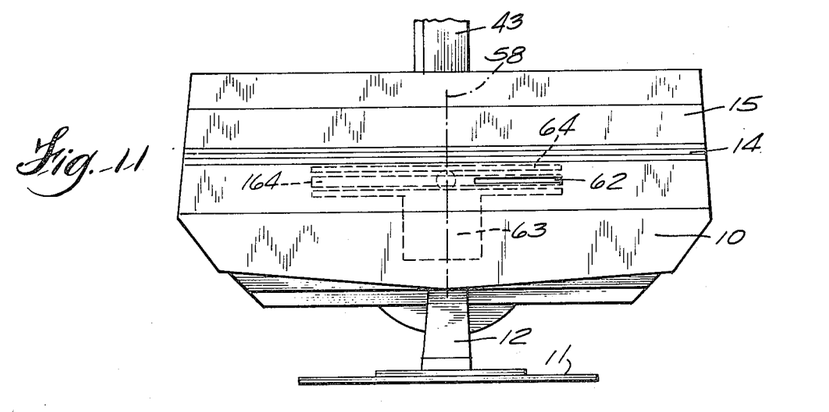
FIG. 11 is a front elevation view of the x-ray table shown in FIG. 1 with parts removed, particularly showing within the table in dashed lines, a main carriage supporting an image intensifier carriage, a film cassette carriage and a shutter carriage.

Tomography involves translating the x-ray tube casing 52 jointly with collimator 57 longitudinally of the table top in one longitudinal direction while the image recording device such as the film cassette 64 on spot film carriage 164, see FIG. 11, is translated in the opposite longitudinal direction within the x-ray table. It is also necessary to angulate the x-ray tube longitudinally continuously during tomography. For this reason, the film cassette carriage 164 and x-ray tube support arm 45 are linked together with a tomographic link 130. The pivot axis of the tomographic link is adjustable with respect to the table top so that this pivot axis if projected through the patient will coincide with the body section plane which is being radiographed. As is well known, anything in planes above or below this plane is blurred out because there is relative motion between the planes and the film in the cassette while anything in the plane itself is sharply recorded because there is no relative motion.

As can be seen in FIG. 3, tomographic carriage 113 supports an upstanding column 131. A tomographic pivot 132 is adapted to slide vertically with respect to the column. This carriage 132 has an internally threaded extension or nut 133 through which passes a lead screw 134. The lead screw 134 has a pulley 135 at its upper end. This pulley is joined by means of a belt 136 to another pulley 137 which is on the shaft of a motor 138. The motor is stationary on its mounting plate 139. The motor is reversible. When it turns in one direction, lead screw 134 turns correspondingly and causes carriage 132 to translate vertically on column 131. Raising and lowering carriage 132 by remote control of reversible motor 138 from control console 70 allows the operator to establish the level of the pivot axis of the tomographic link 130 with respect to the table top. As can be seen in FIG. 3, the top end of the motor 138 is coupled with a stepping type position indicating device 129 which gives the operator at the control console a digital readout of the number of millimeters that the tomographic pivot axis is elevated above the table top.

Extending from carriage 132 is a tomographic pivot shaft 140 which is journaled in a bearing capsule 141 that is fastened to a roller carriage link 142. The axis of shaft 140 constitutes the pivot axis of the tomographic linkage. As can be seen in FIG. 10, roller carriage 142 has four rollers 143, 144, 145, and 146 which have grooved peripheries for engaging the edge tracks 147 of a member 148 which is fastened to the principal tomographic link 130. Thus, the pivot axis or axis of shaft 140 of the principal tomographic link 130 is adjustable in elevation. This axis, when extrapolated over the table top lies in the plane of the body section being radiographed. The member 148 is really two elements which are interlocked as conventional drawer slides and rollers, not shown. One element is fastened to link 130 and the other to member 148. The purpose is to let link 130 extend or telescope while being swung to compensate for distance changes between pivot axis 140 and the tube arm 45 to which link 130 is coupled.

It should be evident from the structure just described that when tube carriage 25 is translated longitudinally during tomography while tomographic carriage 113 is held stationary near the center of the x-ray table, tomographic link 130 will swing about the pivot axis of shaft 140 in the same direction that the tube carriage is translated. Of course, tomography is initiated only after the tube carriage has been translated to one end of the table and it is terminated when the carriage is driven to the other end of the table as indicated by the dashed line representations in FIG. 1.

As the tube head 52 translates longitudinally of the table top during tomography, tube arm 45 is turned continuously so that the central ray of the x-ray tube always passes through the center of cassette 62 and the image intensifier 63. As can be seen in FIG. 5, tube arm axial rotation is obtained by means of a lever 150 which is fixed on a shaft 151 extending from the upper end of tomographic link 130. The short lever 150 is pivotally connected at 152 to a double offset link 153 which is in turn pivotally connected at 154 with the ring bearing structure that guides and supports tube arm 45. As tomographic link 130 swings its attached link 150 swings from the phantom line position which is marked 150' in FIG. 5 to the position at the right which is marked 150''. The angle through which link 150 swings is equal to the total rotational angle of the x-ray tube arm 45 and hence equal to the angulation of the x-ray tube casing 52 and collimator 57 during tomography.

Note in FIG. 3 at the lower end of principal tomographic link 130 that there is a socket 155 from which extends a shaft 156. This shaft 156 rotates and moves in a horizontal plane when principal link 130 is swung during tomography and the shaft extends into the table body for the purpose of translating the film carriage 164 in a direction opposite of that in which the x-ray tube casing is moving during tomography. The shaft 156 also operates a parallax compensating device which will be described later. This shaft moves in a plane because it benefits from distance compensation due to the sliding elements in the tomographic arm as described above.

An important feature of the new x-ray table is that it enables taking tomographic body-sections at different elevations through the patient with all sections magnified on the film an equal amount or, in the alternative, a selected body-section may be radiographed consecutively with different degrees of magnification within limits. This is possible as a result of both the tomographic pivot axis 140 elevation and the height of the table top 14 being made adjustable. In some prior art x-ray tables, only the tomographic pivot elevation is adjustable and in others only the table height is adjustable to permit securing a tomograph of a specified body section. With the new x-ray table, the radiologist may take a series of sections at different levels through the body by having the table top in its lowermost position and adjusting the elevation of the tomographic link pivot 140 consecutively to the desired planes. Those skilled in the art will recognize, however, that as the pivot point is raised nearer to the x-ray tube, there will be greater magnification of the higher sections on the film which is inside of the table body and below the patient. The different degree of magnification between tomographs that are adjacent in the series makes it more difficult for the radiologist to compare because the tomographs in a sense are taken on a different scale. With the present invention, a tomograph may be taken of a plane, that, of course, coincides with the pivot axis 140 of the tomographic link 130. This tomograph will have a constant amount of magnification. Now if the radiologist desires to take a section below the first one, for example, he merely raises the table top 14 and lets the tomographic pivot axis remain at its initial level. The second plane is then at the same distance as was the first in relation to the film and the x-ray tube. Consequently, the degree of magnification of the two tomographs will be identical. If the radiologist desires to take a body section above the first one with the same amount of magnification, he merely lowers the x-ray table top and holds the tomographic arm pivot point at its initial level.

Sometimes the amount of information that can be derived from a tomograph depends on the amount of magnification, so the radiologist would like to obtain a series of the same section with different amounts of magnification. If greater magnification is desired, the radiologist will elevate the table top and patient and also elevate the tomographic arm pivot point so that the same section as the original will be obtained but with greater magnification. If lesser magnification is desired, the table top may be lowered and the tomographic arm pivot point lowered a corresponding amount so the original plane will be tomographed with lesser magnification.

The mechanism for elevating the table top 14 is not shown in the drawings but in FIG. 2 it is evident that the table top is provided with four posts two of which 157 and 158 are visible. These posts are actuated axially and vertically in unison by mechanism in the table body for raising or lowering the table top 14 along with longitudinally movable base 17 and sub-base 16.

Parallax correction will now be discussed primarily in reference to FIGS. 11 – 14. This is a correction which is not found in prior x-ray tables but is required when the x-ray beam is directed at an angle through a shutter or other opening toward a film cassette and an image sensing device. Without this correction, the shutter or other intervening element casts a shadow on one side of the sensing device and it is impossible to get an image that is symmetrical about the central x-ray beam and the center of the sensing device. This problem arises when, for example, the x-ray tube is translated and angulated longitudinally of the table as it is during tomography and in other instances when the sensing device is shifted in the opposite direction.

FIG. 11 shows schematically how the shutter mechanism 64 is located above the plane of the film cassette 62 which is in turn located above the image intensifier 63. Shutter assembly 64, the carriage for cassette 62 and image intensifier 63 are all mounted on a carriage 164 which is inside of table body 10. Carriage 164 has rollers which cooperate with rails that run longitudinally inside of the table body 10. These rollers and rails are not shown in FIG. 11. Shutter assembly 64 is mounted in carriage 164 in such manner that the shutter assembly can be shifted to a limited extent longitudinally with respect to carriage 164. The same is true with respect to the image intensifier 63. The carriage for film cassette 62, however, does not shift with respect to carriage 164. The carriage 164 includes a conventional spot film device which is not shown in detail in FIG. 11. The spot film device functions in its normal manner. That is, it is adapted to maintain the film cassette 62 in its parked position as shown in FIG. 11 and when the radiologist observes something of interest on the monitor which is operated by image intensifier 63, the film cassette 62 is projected so that its center lines up with the central x-ray beam which is marked 58 in FIG. 11 as it is in FIG. 1. When cassette 62 is centered, of course, an x-ray exposure is made and the cassette is projected out of the beam into its parked position again. The spot film device the details of which are not shown is conventional in construction and operation in the respect that it permits centering the whole film cassette 62 or any quadrant or half of the cassette with the x-ray beam so that a partial or whole film may be exposed according to well known technics.

As explained earlier, the x-ray tube casing 52 which is mounted on column 43 of FIG. 11 may be translated longitudinally of the table body jointly with carriage 164 which is inside of the table body. In this longitudinal scanning mode, the central x-ray 58 is directed toward the aligned centers of the shutter assembly 64, the carriage 164 and image intensifier 63. Since the tube does not angulate longitudinally during this type of scanning, there is no need for parallax correction.

During tomography or longitudinal scanning with tube angulation, parallax correction is necessary. In either of these two modes, the x-ray tube casing which is on tube carriage 25 is shifted longitudinally of beam 21 while the tomographic carriage 113 is locked to the beam 21. Moving the tube carriage longitudinally thus causes tomographic link 130 to turn the tube arm 45 and thereby angulate the x-ray tube casing longitudinally of the table. When the x-ray tube casing is swung during tomography, the main carriage 164 inside of the table is moved in an opposite longitudinal direction. When the tube carriage is shifted longitudinally for ordinary radiography the x-ray tube casing is also angulated longitudinally by virtue of tube arm 45 being turned by tomographic link 130. During oblique radiography, main carriage 164 is shifted within x-ray table body 10 in a direction opposite to that in which the tube carriage is shifted. Viewing or radiographing of different parts of the body is obtained by shifting the patient longitudinally with table top 14. Under these circumstances parallax correction is necessary.

Figure 12:
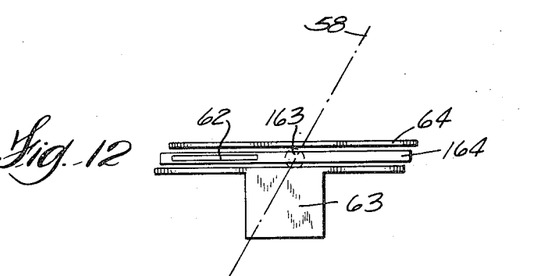
FIG. 12 shows the relationship of the carriages within the table during parallax correction.
Figure 13:
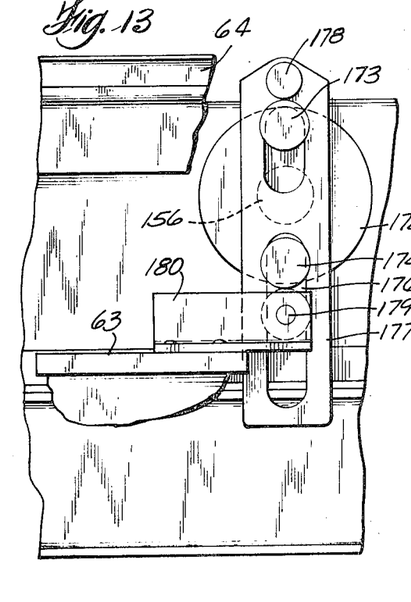
FIG. 13 is a front elevation view, with parts broken away, of a mechanism for shifting the carriages within the table for parallax correction; and, FIG. 14 is a side view of the mechanism shown in the preceding figure.

A functional description of parallax correction will be given in reference to FIG. 12. Assume that the x-ray tube casing has been translated longitudinally of the x-ray table body and that the x-ray tube casing has been angulated so the central beam 58 therefrom is directed at an angle toward the shutter assembly 64, the film carriage 164 and image intensifier 63. Note in FIG. 12 that in accordance with the invention, shutter assembly 64 is shifted to the right with respect to the center of carriage 164 and image intensifier 63 is shifted to the left of the center. In other words, the shutter assembly 64 and image intensifier 63 are shifted in opposite directions about a fixed center point in carriage 164 which is marked 163 and is intersected by central ray 58. Since the shutter blades in shutter assembly 64 go to the right and the intensifier 63 goes to the left, the shutters will define a field which is symmetrical about the center of image intensifier 63 and about the center of carriage 164. Thus, if the film cassette 62 is in its central position as it is during tomography, the x-ray image will be symmetrical about the center of the whole film, the film quadrant, or other section on which the tomographic view is to be made.

The amounts by which the shutter assembly 64 is shifted in one direction while the image intensifier 63 is shifted in the other direction is proportional to the amount of tube casing longitudinal translation and angulation. This parallax correction is made automatically regardless of whether the tube casing is translated and angulated in one longitudinal direction of the table or the other. A more specific description of the elements for accomplishing parallax correction will now be given in reference to FIGS. 13 and 14.

Figure 14:
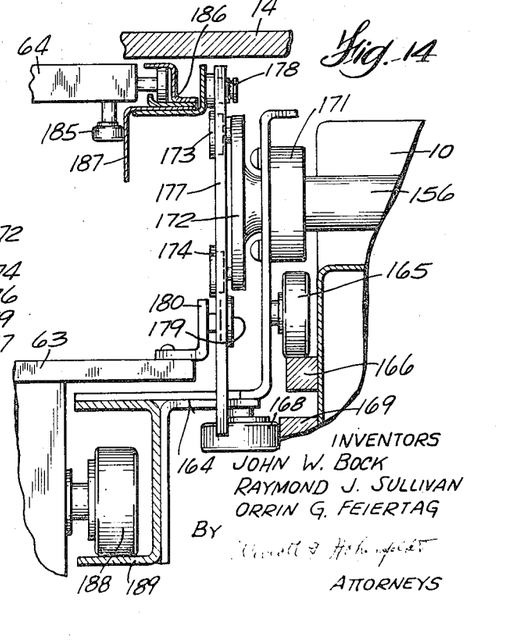

FIGS. 3 and 14 show shaft 156 which extends inside of the table body from the lower end of the tomographic arm as was discussed and depicted in connection with FIG. 0. This shaft 156 is fastened to carriage 164 inside of the table so that when the shaft translates in a horizontal plane it also shifts carriage 164. Such translation would occur, as explained above, when the tube casing is being translated longitudinally in the opposite direction during normal angular radiography or tomography. The axis of shaft 156 as viewed endwise in FIG. 13 coincides with the horizontal center line 163 through the carriage 164 as discussed in connection with FIG. 12.

FIG. 14 shows that carriage 164 is provided with rollers 165 which run on longitudinal tracks 166 the latter being fastened to the interior of table body 10. Rollers 165 accept the vertical load of carriage 164. There are additional rollers 168 which cooperate with longitudinal tracks 169 to accept the transverse load of carriage 164. Shaft 156 extends through an opening in table body 10. The shaft is journaled in a bearing structure 171 which is fastened to carriage 164. It will thus be seen that if shaft 156 is moved toward or away from the observer in FIG. 14 that carriage 164 will shift longitudinally on its tracks 166 and 169.

Shaft 156 also rotates through a small angle as it is translating by virtue of tomographic link 130 rotating at this time. Thus, shaft 156 has the same angular rotation as tomographic link 130. This angular rotation establishes the amount of parallax correction that is made.

Shaft 156 has a circular plate 172 fastened on its end. Extending from plate 172 are a pair of diametrically oppositely spaced bearing pins 173 and 174. These bearing pins are flanged as will be evidenced from inspection of the drawings to retain them in cooperating slots 175 and 176. These slots are in a link 177. The top end of the link has a pivot pin 178 connecting it with the shutter assembly 64. The lower end of the link 177 is pivotally pinned at 179 to an angular bracket 180 which is fastened to image intensifier carriage 63. Assume now that shaft 156 is rotated slightly counterclockwise as viewed in FIG. 13. This will result in pin bearing 173 driving the top end of link 177 to the left in which case the shutter assembly 64 will be shifted correspondingly to the left. Similarly, the lower end of link 177 will be driven by orbiting pin bearing 174 to the right in which case the image intensifier carriage 63 will be driven to the right in an amount which is proportional to angular rotation of shaft 156. If shaft 156 is turned in the opposite direction, the shutter assembly 64 and image intensifier 63 will move in correspondingly opposite directions so that a parallax correction will be made regardless of which way the x-ray tube casing is shifted and angulated longitudinally with respect to the x-ray table. The film cassette tray which would be in a plane between shutter assembly 64 and intensifier 63 has been omitted from FIGS. 13 and 14 for the sake of clarity. It will be understood, however, that the film itself within the cassette 62 lies in a horizontal plane which passes through the center of shaft 156. Thus, the shutter assembly and image intensifier are shifted about this center point as explained earlier.

Note in FIG. 14 that the shutter assembly 64 has a pair of rollers 184 and 185 which cooperate with tracks 186 and 187. Although it is not evident from the drawings, in the actual construction, track 186 is mounted for limited longitudinal movement under the shifting influence of pin bearing 178 which swings through a small angle when the circular plate 172 is turned. Thus, for parallax correction, the whole support for the shutter mechanism 64 is shifted longitudinally and oppositely of the image intensifier 63.

The shutter mechanism is provided with rollers for the purpose of transferring it on its carriage out of the x-ray beam path to a storage position when its use is not desired. When the shutter mechanism is centered with the x-ray beam, it is interlocked with the tracks 186 and 187 by means, not shown, so that it can be shifted for a limited distance with the tracks for parallax correction. Similarly, the image intensifier 63 has a laterally extending roller 188 which bears on a track 189. The latter track is fastened to main carriage 164 so that the image intensifier 63 can shift a limited distance longitudinally when shaft 156 is turned and link 177 swings.

In summary, a new x-ray diagnostic system has been described. This system is distinguished by its ability to translate the x-ray tube arm laterally of the x-ray table, while simultaneously angulating the x-ray tube to maintain a central ray on the central point of the image sensing means which are in the table. By this means, lateral angular views may be taken of a patient without requiring rotation of the patient in the x-ray beam but, rather, offering the convenience of simply and automatically rotating the x-ray tube casing. The system also features taking body sections or tomographs with controlled amounts of magnification or no image magnification at the option of the radiologist. In other words, the tomographic link pivot may be adjusted upwardly or downwardly to select different planes in the patient with different degrees of magnification. The tomographic pivot may also be shifted simultaneously with correspondingly elevating or lowering the patient with the table top in which case the same plane in the patient may be radiographed with different degrees of magnification. In other words, this system offers the radiologist the options of shifting the tomographic pivot and table top coordinately or independently.

Image sensing devices in the table move relative to each other so that parallax is corrected. This correction is effectuated during normal radiographic scanning and during conduct of tomography. The system represents a significant advancement in the diagnostic x-ray art because it offers an opportunity to conduct most, if not all, of the presently accepted diagnostic technics with a single piece of apparatus so that it is no longer necessary to transfer patients having complex cases from one specialized x-ray table to another for a complete examination.

Although a preferred embodiment of the invention has been described in detail, such description should be considered illustrative rather than limiting, for the invention may be variously embodied and is to be limited only by interpretation of the claims which follow.

We claim:

1. A diagnostic x-ray system comprising:
   a. an x-ray table including an x-ray transmissive patient supporting table top,
   b. means in the table below said table top for sensing an x-ray image which is produced by projecting an x-ray beam toward the table top,
   c. beam means associated with the table and extending longitudinally thereof,
   d. a first carriage means mounted for selective longitudinal movement on said beam means,
   e. x-ray tube means,
   f. column means extending substantially normal to said table top and supported on said first carriage means,
   g. x-ray tube support means comprising an arm means extending laterally of said table top, said arm means being journaled on said column means for axial rotation and for translation bilaterally of said table top and said x-ray tube means being mounted on said arm means for angulating laterally about a longitudinally directed axis, h. means operatively coupled with said arm means and said tube means to translate said arm means in one direction laterally of said table top while simultaneously angulating said tube means laterally of said table top in an opposite direction, whereby the x-ray beam will remain directed at said image sensing means, i. a second carriage means mounted for selective longitudinal movements on said beam means, j. extensible tomographic link means pivotally mounted on said second carriage means and having its opposed ends respectively operatively coupled to said arm means and to said sensing means below the table top, k. locking means selectively operable to lock said first carriage means to said second carriage means so that the carriages may be translated longitudinally without pivoting said tomographic link means to scan the x-ray tube at any selectable angulation longitudinally of said table top, and said lock means being alternately operable to lock said second carriage means to said beam means and release said first carriage means for longitudinal travel and simultaneously pivoting of said tomographic link means.

2. A diagnostic X-ray system comprising:

a. an x-ray table including an x-ray transmissive patient supporting table top, b. means in said table below said table top for sensing an x-ray image which is produced by projecting an x-ray beam toward the table top, c. column means adjacent said table top, d. a support arm means extending substantially laterally of said table top and being mounted on said column means for axial rotation and for bidirectional movement laterally of said table top, e. beam means extending longitudinally of said x-ray table and adjacent thereto, f. a first carriage means mounted on and adapted to selectively travel longitudinally on said beam means, said first carriage means supporting the aforesaid column means, g. a second carriage means mounted on and adapted to selectively travel longitudinally on said beam means, h. a tomographic link means pivotally mounted on said second carriage means, i. means coupling one end of said tomographic link means to said support arm means whereby to rotate said support arm means and angulate said tube means longitudinally in response to moving said first carriage longitudinally, j. means connecting the other end of said tomographic link means to said image sensing means so that the latter moves longitudinally oppositely of said x-ray tube means, and k. means adapted to selectively anchor said second carriage means when it is desired to swing said tomographic link means by moving said first carriage means and to interlock said carriages together when it is desired to scan the x-ray tube means longitudinally of said table top.

3. The invention set forth in claim 2 including:

a. a variable x-ray field masking means, a film support means and an x-ray image intensifier means located beneath said table top in the recited order, b. second linkage means coupled with said other end of said tomographic link means and being adapted to shift said masking means and said image intensifier means predetermined amounts in opposite directions about a pivot axis that coincides with the film plane when said tube means is moved longitudinally of said table means in the one direction and angulated longitudinally.

4. The invention set forth in claim 2 including:

a. first bearing means journaling said arm means in said column means for rotation of the arm means about an axis that projects laterally of said table top, b. second bearing means mounted on said first bearing means and supporting said arm means for bilateral translation through said first bearing means with respect to said column means, c. motor means mounted on said arm means, d. lead screw means journaled on said arm means and coupled for being turned by said motor means, said screw means extending along said arm means, and e. nut means coupling said lead screw means and said first bearing means for driving said arm means in a lateral direction with respect to said first bearing means.

5. The invention set forth in claim 4 wherein:

a. mechanical coupling means for angulating said x-ray tube means laterally are interposed between said lead screw means and said tube means.

6. The invention set forth in claim 2 wherein:

a. said x-ray tube means is pivotally mounted on a longitudinal axis at an end of said arm means to allow lateral angulation of the tube means with respect to said table top, b. driving means operatively coupled with said arm means and said tube means to translate said arm means in a selected direction laterally of said table top while simultaneously angulating said tube means laterally of the table top in an opposite direction, the said driving means being operable to set the lateral angulation of said tube means whereupon said interlocking of said carriages permits longitudinal scanning with the tube at a fixed lateral angulation.

7. The invention set forth in claim 2 wherein:

a. said x-ray table is supported for tilting on a transverse axis and said beam means is fastened to said table and extends longitudinally thereof.

8. A diagnostic x-ray system comprising:

a. an x-ray table body means supported for tilting longitudinally on a transverse axis and having an x-ray transparent table top, b. a beam means connected with the body means and extending longitudinally thereof, c. an x-ray tube carriage means adapted to be selectively translated on said beam means longitudinally of said body and top, d. column means supported on said carriage means, e. an elongated x-ray tube support arm means journaled for selective rotation in said column means, said arm means extending laterally of said table top, f. an x-ray tube means mounted on said support arm means over said table top and adapted to rotate with said arm means for angulating the x-ray tube means longitudinally of said table top, g. means responding to longitudinal translation of said x-ray tube carriage means by rotating said tube support arm means and thereby angulating said tube means longitudinally in proportion to the amount of carriage translation,
h. a tomographic carriage means mounted on said beam means and adapted to be selectively translated longitudinally of said table body means jointly with said tube carriage means or alternately to be held in a fixed position so that said tube carriage means may translate independently,
i. means for selectively engaging said tomographic carriage means with tube carriage means for joint longitudinal translation or for alternately engaging said tomographic carriage means relative to said beam means so that said tube carriage means is free to translate longitudinally independently, and
j. a tomographic link means pivotally mounted on said tomographic carriage,
k. said link means being operatively connected with said tube support arm means to rotate the arm means when said x-ray tube carriage means translates and said tomographic carriage means is fixed.

9. A diagnostic x-ray system comprising:
a. an x-ray table body means having an x-ray transparent table top,
b. an x-ray tube carriage means adapted to be selectively translated longitudinally of said body and top,
c. column means supported on said carriage means,
d. an elongated x-ray tube support arm means journaled for selective rotation in said column means, said arm means extending laterally of said table top,
e. an x-ray tube means mounted on said support arm means over said table top and adapted to rotate with said arm means for angulating the x-ray tube means longitudinally of said table top, and
f. means responding to longitudinal translation of said x-ray tube carriage means by rotating said tube support arm means and thereby angulating said tube means longitudinally in proportion to the amount of carriage translation,
g. a shutter means movably mounted within said table body under said table top,
h. means adapted to position a film in a plane under said shutter means,
i. an image intensifier means movably mounted within said table body under the plane of the film,
j. means interconnecting said shutter means and said image intensifier means, said interconnecting means being pivotable about an axis that lies in said film plane, and
k. means coupling said interconnecting means and said tube support arm rotating means whereby operation of the latter during longitudinal translation of said x-ray tube carriage will turn said interconnecting means and shift said image intensifier means and said shutter means in opposite longitudinal directions.

10. A diagnostic x-ray system comprising:
a. an x-ray table body means,
b. a carriage means mounted for bidirectional longitudinal movement within said body means,
c. a shutter means mounted in a first plane for limited bidirectional longitudinal translation on said carriage means,
d. means adapted to position a film cassette in said carriage means in a second plane that is substantially parallel with and below the first plane,
e. x-ray tube means,
f. a tube carriage means mounted for selective bidirectional translation longitudinally of said table body means and supporting said x-ray tube means over said table body means,
g. means adapted to angulate said x-ray tube means longitudinally in correspondence with the translation of said tube carriage means whereupon the central beam from said x-ray tube means will remain directed substantially at the center of a selected film area,
h. means adapted to shift said shutter means in the direction in which said tube carriage means is translated so that the shutter means will not cut off any desired part of the x-ray beam when said x-ray tube is angulated,
i. an image intensifier means mounted for limited bidirectional translation on said carriage means in a plane below the plane of a film in said cassette,
j. means interconnecting said shutter means and said image intensifier means, and
k. means rotating said interconnecting means about an axis that is coincident with the film plane through an angle corresponding with the angulation of said x-ray tube means, whereby said image intensifier means will shift in a direction opposite to that of the shutter means.

11. The invention set forth in claim 10 including:
a. a tomographic carriage means mounted for selective bidirectional translation longitudinally of said table body means,
b. a tomographic link means pivotally mounted on said tomographic carriage means,
c. a shaft means fastened at one end of said tomographic link means and extending into said table body to where it is journaled in said carriage means and operatively coupled to said interconnecting means, said shaft means translating said carriage means and turning said interconnecting means when said tomographic link means is pivoted.

12. A diagnostic x-ray system comprising:
a. x-ray table body means,
b. an x-ray transmissive patient supporting table top mounted on said body means,
c. means in said body means operatively coupled with said top for selectively raising said top above said body means,
d. carriage means in said body adapted to support a film cassette in a plane below the table top,
e. an x-ray tube carriage that is selectively translatable in opposite directions longitudinally of said body,
f. an x-ray tube means support on said tube carriage, said tube means support extending over said table top,
g. an x-ray tube means pivotably mounted on said support for being angulated longitudinally of the table top,
h. a tomographic carriage that is translatable longitudinally of said body in substantial parallelism with said tube carriage, i. means for selectively interlocking said tomographic and tube carriages for joint longitudinal translation or alternately holding said tomographic carriage in a fixed position so that said tube carriage may translate independently, j. a pivot carriage that is supported on and adjustable with respect to said tomographic carriage, k. a tomographic link pivotally mounted on said pivot carriage, the pivotal axis of said link being projected laterally over said table top, said axis being adjustable with respect to said table top by adjusting said pivot carriage, the said link being operatively coupled with said tube support to angulate the support and said tube means in response to said tube carriage translating independently, l. the plane in a body through which said pivot axis projects being selectable by adjusting either or both said pivot carriage or the height of said table top, whereupon the amount of magnification of the image of the plane on a film in the cassette may be selectively controlled.

* * * * *